(12) United States Patent
Kawano et al.

(10) Patent No.: US 8,363,158 B2
(45) Date of Patent: Jan. 29, 2013

(54) IMAGING DEVICE EMPLOYING A BUFFER UNIT HAVING A TERMINATING RESISTOR

(75) Inventors: Takeshi Kawano, Tokyo (JP); Koji Ozaki, Yokohama (JP)

(73) Assignee: Nikon Corporation, Tokyo (JP)

( * ) Notice: Subject to any disclaimer, the term of this patent is extended or adjusted under 35 U.S.C. 154(b) by 263 days.

(21) Appl. No.: 12/838,907

(22) Filed: Jul. 19, 2010

(65) Prior Publication Data
US 2011/0032375 A1   Feb. 10, 2011

(30) Foreign Application Priority Data
Jul. 27, 2009  (JP) .................................. 2009-174030

(51) Int. Cl.
*H04N 5/225* (2006.01)
(52) U.S. Cl. ...................................................... 348/372
(58) Field of Classification Search ............... 348/222.1, 348/372
See application file for complete search history.

(56) References Cited

U.S. PATENT DOCUMENTS

| | | | | |
|---|---|---|---|---|
| 6,882,593 | B2 * | 4/2005 | Best et al. .................. | 365/233.1 |
| 8,076,954 | B2 * | 12/2011 | Murayama et al. ............. | 326/30 |
| 2004/0100812 | A1 * | 5/2004 | Wu ................................. | 365/72 |
| 2009/0224797 | A1 * | 9/2009 | Tanaka ........................... | 326/30 |

FOREIGN PATENT DOCUMENTS
JP   A-2005-223588   8/2005

* cited by examiner

*Primary Examiner* — Jason Chan
*Assistant Examiner* — Gary C Vieaux
(74) *Attorney, Agent, or Firm* — Oliff & Berridge, PLC

(57) ABSTRACT

An imaging device includes an imaging unit, a buffer unit, an image processing unit, a processing determining unit and a power control unit. The imaging unit has an imaging sensor converting a subject image into an electrical signal and generates an image data of a photographed image. The buffer unit has a terminating resistor and temporarily stores the image data. The image processing unit performs image processing on the image data. The processing determining unit determines whether or not high-speed processing requiring a high-speed data transfer is performed. The power control unit disables the terminating resistor of the buffer unit and sets a clock supplied to the buffer unit at low speed compared to a case in which the terminating resistor is enabled when the high-speed processing is not performed. As a result, it is possible to reduce power consumption in the imaging device supporting the high-speed processing.

6 Claims, 3 Drawing Sheets

US 8,363,158 B2

IMAGING DEVICE EMPLOYING A BUFFER UNIT HAVING A TERMINATING RESISTOR

CROSS-REFERENCE TO RELATED APPLICATION

This application is based upon and claims the benefit of priority from Japanese Patent Application No. 2009-174030, filed on Jul. 27, 2009, the entire contents of which are incorporated herein by reference.

BACKGROUND

1. Field

The present application relates to an imaging device.

2. Description of the Related Art

In general, an imaging device such as a digital camera includes an imaging unit converting a subject image into an electrical signal and generating an image data, a memory temporarily storing the image data, and an image processing unit performing image processing on the image data. In recent years, power consumption of the digital camera increases because a clock used for the image processing unit and so on is speeding up in accordance with increase in the number of pixels. Note that an art lowering a frequency of the clock in accordance with a temperature of an imaging sensor of the imaging unit is proposed to reduce the power consumption in the digital camera in which power supply voltage is supplied from a battery (for example, refer to Japanese Unexamined Patent Application Publication No. 2005-223588).

Here, a general memory is mounted on a system under a state in which a terminating resistor is fixed to be either connected or unconnected. For example, the memory is fixed to the state in which the terminating resistor is not connected to reduce the power consumption in the digital camera. Besides, the memory is fixed to the state in which the terminating resistor is connected to enable high-speed processing in a personal computer and so on.

The digital camera is required to perform the image processing and so on in higher speed in accordance with significant increase of the number of pixels. For example, a reflection of a signal cannot be fully reduced under a configuration in which the memory mounted on the digital camera is fixed to the state in which the terminating resistor is not connected, and therefore, it is difficult to perform the image processing and so on in higher speed. On the other hand, the digital camera is required to reduce the power consumption so that the battery can be used for a long time. When the memory mounted on the digital camera is fixed to the state in which the terminating resistor is connected to enable the high-speed processing, the power consumption increases significantly.

SUMMARY

A proposition of the present application is to reduce power consumption in an imaging device supporting high-speed processing.

The imaging device includes an imaging unit, a buffer unit, an image processing unit, a processing determining unit and a power control unit. The imaging unit includes an imaging sensor converting a subject image into an electrical signal and generates an image data of a photographed image. The buffer unit includes a terminating resistor and temporarily stores the image data. The image processing unit performs image processing on the image data. The processing determining unit determines whether or not high-speed processing requiring a high-speed data transfer is performed. The power control unit disables the terminating resistor of the buffer unit and sets a clock supplied to the buffer unit at low speed compared to a case in which the terminating resistor is enabled when the high-speed processing is not performed.

DETAILED DESCRIPTION OF THE EMBODIMENTS

Hereinafter, embodiments of the present invention are described by using the drawings.

Figure 1:
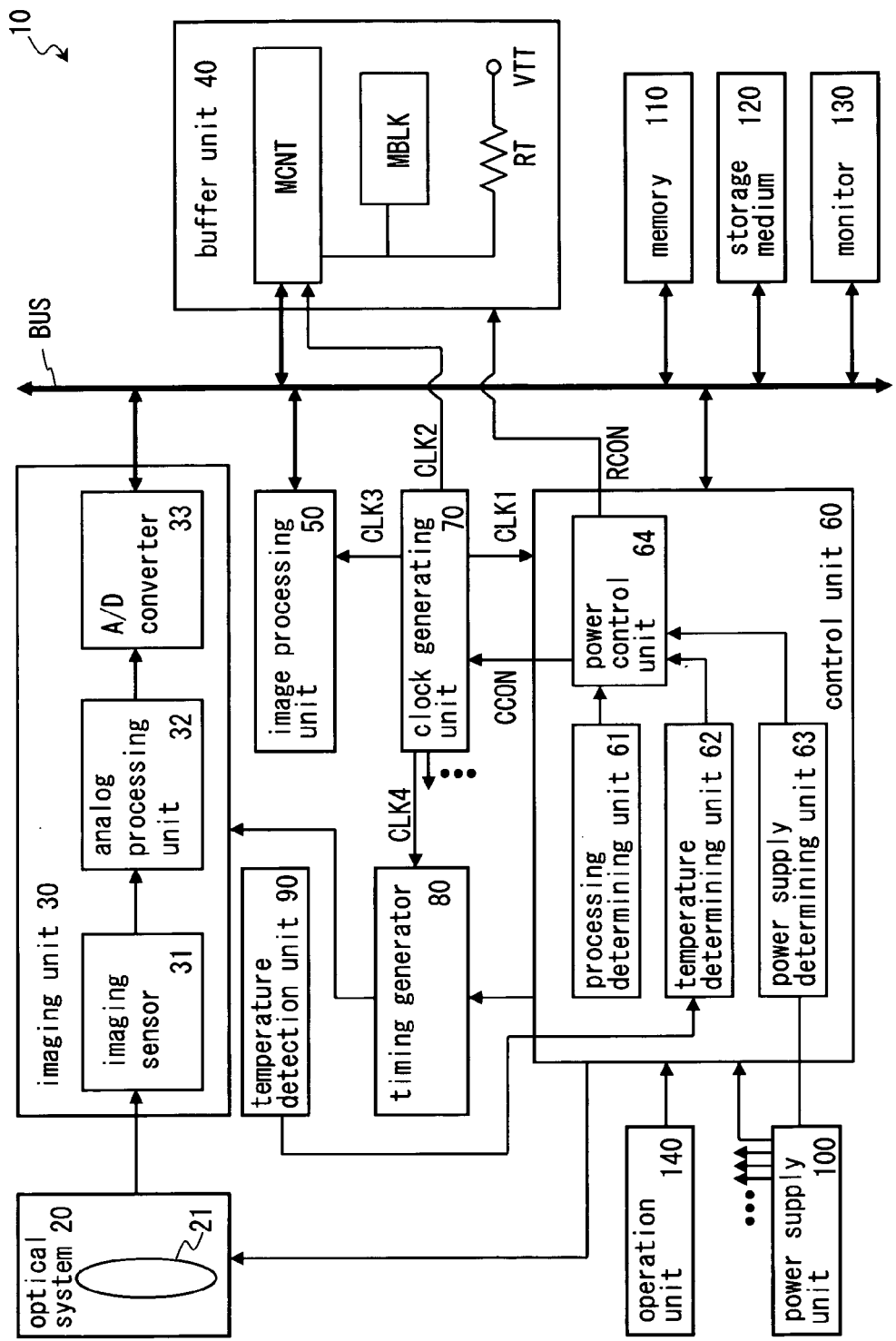
FIG. 1 is a view illustrating an overview of a digital camera according to an embodiment.

FIG. 1 illustrates an embodiment of the present invention. An imaging device of this embodiment is, for example, a digital camera 10. The digital camera 10 includes an optical system 20, an imaging unit 30, a buffer unit 40, an image processing unit 50, a control unit 60, a clock generating unit 70, a timing generator 80, a temperature detection unit 90, a power supply unit 100, a memory 110, a storage medium 120, a monitor 130 and an operation unit 140. For example, the imaging unit 30, the buffer unit 40, the image processing unit 50, the control unit 60, the memory 110, the storage medium 120 and the monitor 130 are coupled to a bus BUS. Namely, the imaging unit 30, the buffer unit 40, the image processing unit 50, the control unit 60, the memory 110, the storage medium 120 and the monitor 130 are coupled with each other via the bus BUS.

The optical system 20 includes an imaging lens 21 forming a subject image on a light-receiving surface of an imaging sensor 31. Note that the optical system 20 may include a zoom lens, a focus lens, and so on in addition to the imaging lens 21.

The imaging unit 30 includes the imaging sensor 31, an analog processing unit 32 and an A/D converter 33, and generates an image data of a photographed image. For example, the imaging sensor 31 is a CCD imaging sensor and a CMOS imaging sensor. The imaging sensor 31 converts the subject image which is incident via the imaging lens 21 into an electrical signal (hereinafter, called also as an image signal), and outputs the converted electrical signal to the analog processing unit 32. The analog processing unit 32 is an analog front end circuit performing analog signal processing on the image signal received from the imaging sensor 31. For example, the analog processing unit 32 performs a gain control adjusting a gain of the image signal, correlated double sampling processing reducing a noise component of the image signal, and so on. The A/D converter 33 converts the analog image signal received from the analog processing unit 32 into a digital image signal. For example, the imaging unit 30 temporarily stores the image data converted into the digital image signal by the A/D converter 33 to the buffer unit 40.

The buffer unit 40 is made up of, for example, an SDRAM in Double Data Rate (DDR) mode, and temporarily stores data such as the image data. Note that the buffer unit 40 may be made up of an SDRAM in other than the DDR mode, or may be made up of a semiconductor memory other than the SDRAM. For example, the buffer unit 40 includes a memory controller MCNT, a memory block MBLK and a terminating resistor RT. The memory controller MCNT controls an access of the memory block MBL based on signals representing an address, a command, and so on received from outside of the buffer unit 40. The memory block MBLK temporarily stores data such as the image data.

The terminating resistor RT is connected between an end portion of a transmission line of a signal of the buffer unit 40 and a terminating power supply VTT (a half value of a power supply voltage for input/output signals) to reduce, for example, a reflection of a signal. Note that the terminating resistor RT may be provided inside the memory block MBLK. For example, the terminating resistor RT is provided inside the memory block MBLK when the buffer unit 40 is made up of an SDRAM in DDR2 mode or the like having an ODT (On Die Termination) function. Besides, the terminating resistor RT is set to be either enabled or disabled based on a resistor control signal RCON.

For example, the buffer unit 40 stops a supply of the terminating power supply VTT to the terminating resistor RT to disable the terminating resistor RT when the resistor control signal RCON representing to disable the terminating resistor RT is received. Namely, when the terminating resistor RT is disabled, the transmission line is electrically unconnected to the terminating power supply VTT. In other words, the transmission line is electrically connected to the terminating power supply VTT via the terminating resistor RT when the terminating resistor RT is enabled. Note that, for example, the ODT function is controlled by the resistor control signal RCON when the buffer unit 40 is made up of the SDRAM in DDR2 mode and so on having the ODT function.

The image processing unit 50 performs image processing such as white balance processing, contour compensation processing, and gamma processing on the image data generated by the imaging unit 30. Note that the image processing unit 50 may read the image data generated by the imaging unit 30 from the buffer unit 40, or may sequentially receive the image data from the imaging unit 30. The image processing unit 50 temporarily stores the image data to which the image processing is performed to the buffer unit 40.

Besides, the image processing unit 50 may perform compression processing and so on compressing the image data to which the image processing is performed in a JPEG (Joint Photographic Experts Group) format and so on. For example, the image processing unit 50 reads the image data to which the image processing is performed from the buffer unit 40, compresses the read image data in the JPEG format and so on, and temporarily stores the compressed image data to the buffer unit 40. Note that the image processing unit 50 may be provided inside the control unit 60.

The control unit 60 is, for example, a microprocessor, and controls operations of the digital camera 10 based on a program stored in the memory 110. For example, the control unit 60 performs an automatic white balance control, an automatic focus control, an automatic exposure control, recording of the image data, and so on. Besides, the control unit 60 includes a processing determining unit 61, a temperature determining unit 62, a power supply determining unit 63 and a power control unit 64, and performs a control for power saving.

The processing determining unit 61 determines whether or not high-speed processing requiring a high-speed data transfer is performed. For example, the digital camera 10 is necessary to perform generation processing of the image data by the imaging unit 30, the image processing, the compression processing by the image processing unit 50, and so on in high-speed when a photographing in continuous shooting mode is performed and when a moving image photographing is performed. In this case, for example, the image data is transmitted and received to/from the buffer unit 40 and so on by the high-speed data transfer.

Namely, the processing determining unit 61 determines that the high-speed processing requiring high-speed data transfer is performed, for example, when the photographing in continuous shooting mode is performed and when the moving image photographing is performed. Note that, for example, it is not necessary to perform the data transfer in high-speed in reproducing processing of the image data after the photographing is finished. Accordingly, the processing determining unit 61 determines that the high-speed processing is not performed when, for example, the reproducing processing is performed.

The temperature determining unit 62 determines whether or not a temperature detected by a temperature detection unit 90 is higher than a threshold temperature set in advance. For example, when an upper limit of a temperature range in which devices such as the imaging sensor 31 is not broken (hereinafter, called also as an upper limit temperature) is 70 degrees and the threshold temperature is 60 degrees, the temperature determining unit 62 determines whether or not the temperature detected by the temperature detection unit 90 is higher than 60 degrees.

The power supply determining unit 63 identifies types of a power supply. For example, the power supply determining unit 63 determines that the type of the power supply is a battery when the power supply voltage generated by the power supply unit 100 is generated from an output voltage of a not-illustrated battery. Besides, for example, the power supply determining unit 63 determines that the type of the power supply is an AC power when the power supply voltage generated by the power supply unit 100 is generated from a voltage supplied via a not-illustrated AC adapter.

The power control unit 64 receives determination results of the processing determining unit 61, the temperature determining unit 62 and the power supply determining unit 63, outputs the resistor control signal RCON to the buffer unit 40, and outputs a clock control signal CCON to the clock generating unit 70. For example, the resistor control signal RCON is a signal indicating whether the terminating resistor RT is enabled or disabled. Namely, the enable/disable (on/off) of the terminating resistor RT is switched based on the resistor control signal RCON. Besides, the clock control signal CCON is a signal indicating whether or not a clock CLK is set at high speed.

Namely, the power control unit 64 performs a control of the enable/disable of the terminating resistor RT and a control of a frequency of the clock CLK based on the determination results of the processing determining unit 61, the temperature determining unit 62 and the power supply determining unit 63. For example, the power control unit 64 disables the terminating resistor RT and sets the clock CLK generated by the clock generating unit 70 at low speed compared to a case in which the terminating resistor RT is enabled when it is determined by the processing determining unit 61 that the high-speed processing is not performed.

The clock generating unit 70 generates the clocks CLK (CLK1, CLK2, CLK3, CLK4, . . . ) with the frequencies set by the clock control signal CCON, and supplies the generated clock CLK to each block such as the control unit 60. For example, the clock CLK1 is an operation clock of the control unit 60, and the clock CLK2 is an operation clock of the buffer unit 40. Besides, the clock CLK3 is an operation clock of the image processing unit 50, and the clock CLK4 is an operation clock of the timing generator 80. Note that connection lines of the clocks CLK supplied to the blocks other than the buffer unit 40, the image processing unit 50, the control unit 60 and the timing generator 80 are not illustrated for easy to see, in the drawing.

For example, the clock CLK generated by the clock generating unit 70 is set at either a high-speed clock CLK or a low-speed clock CLK which is in lower speed than the high-speed clock CLK based on the clock control signal CCON. When the high-speed clock CLK is supplied from the clock generating unit 70, the digital camera 10 is able to perform relatively high-speed processing. Namely, the digital camera 10 supports the high-speed processing.

Here, for example, a ratio of frequencies of the high-speed clocks CLK (CLK1, CLK2, CLK3, CLK4, . . . ) is set by the control unit 60 in advance. Similarly, a ratio of frequencies of the low-speed clocks CLK (CLK1, CLK2, CLK3, CLK4, . . . ) is set by the control unit 60 in advance. Note that the clock generating unit 70 may be provided inside any of the image processing unit 50, the control unit 60 and the timing generator 80.

The timing generator 80 is controlled by the control unit 60, and controls a driving timing of the imaging unit 30. Namely, the imaging unit 30 operates in synchronization with the clock CLK4. Note that the timing generator 80 may be provided inside the imaging unit 30 and the control unit 60.

The temperature detection unit 90 is provided at a periphery of, for example, the imaging sensor 31, and detects the temperature at the periphery of the imaging sensor 31. The temperature detection unit 90 notifies the detected temperature to the temperature determining unit 62. Note that the temperature detection unit 90 may be provided at the periphery of the image processing unit 50, or at plural positions. When the temperature detection units 90 are provided at the plural positions, the temperature determining unit 62 compares, for example, the maximum temperature among the temperatures notified from the temperature detection units 90 at the plural positions with the threshold temperature as the temperature detected by the temperature detection unit 90.

The power supply unit 100 generates the power supply voltage, and supplies the generated power supply voltage to each block such as the control unit 60. Note that power supply lines of the power supply voltage supplied to the blocks other than the control unit 60 are not illustrated for easy to see, in the drawing. For example, the power supply unit 100 generates the power supply voltage from the voltage supplied via the AC adapter (not-illustrated) when the voltage is supplied to the power supply unit 100 via the AC adapter. Besides, for example, the power supply unit 100 generates the power supply voltage from the output voltage of the battery (not-illustrate) when the voltage is not supplied to the power supply unit 100 via the AC adapter.

The memory 110 is a built-in memory formed by, for example, a nonvolatile memory such as a flash memory, and stores programs and so on to control the operations of the digital camera 10. Note that the memory 110 may store the image data and so on of the photographed images. The storage medium 120 stores the image data and so on of the photographed image via a storage medium interface (not-illustrated). The monitor 130 is, for example, a liquid crystal display, and displays a through image, the photographed image, the image stored at the memory 110, the image stored at the storage medium 120, a menu screen and so on. The operation unit 140 includes a release button and other various switches, and it is operated by a user to operate the digital camera 10.

Figure 2:
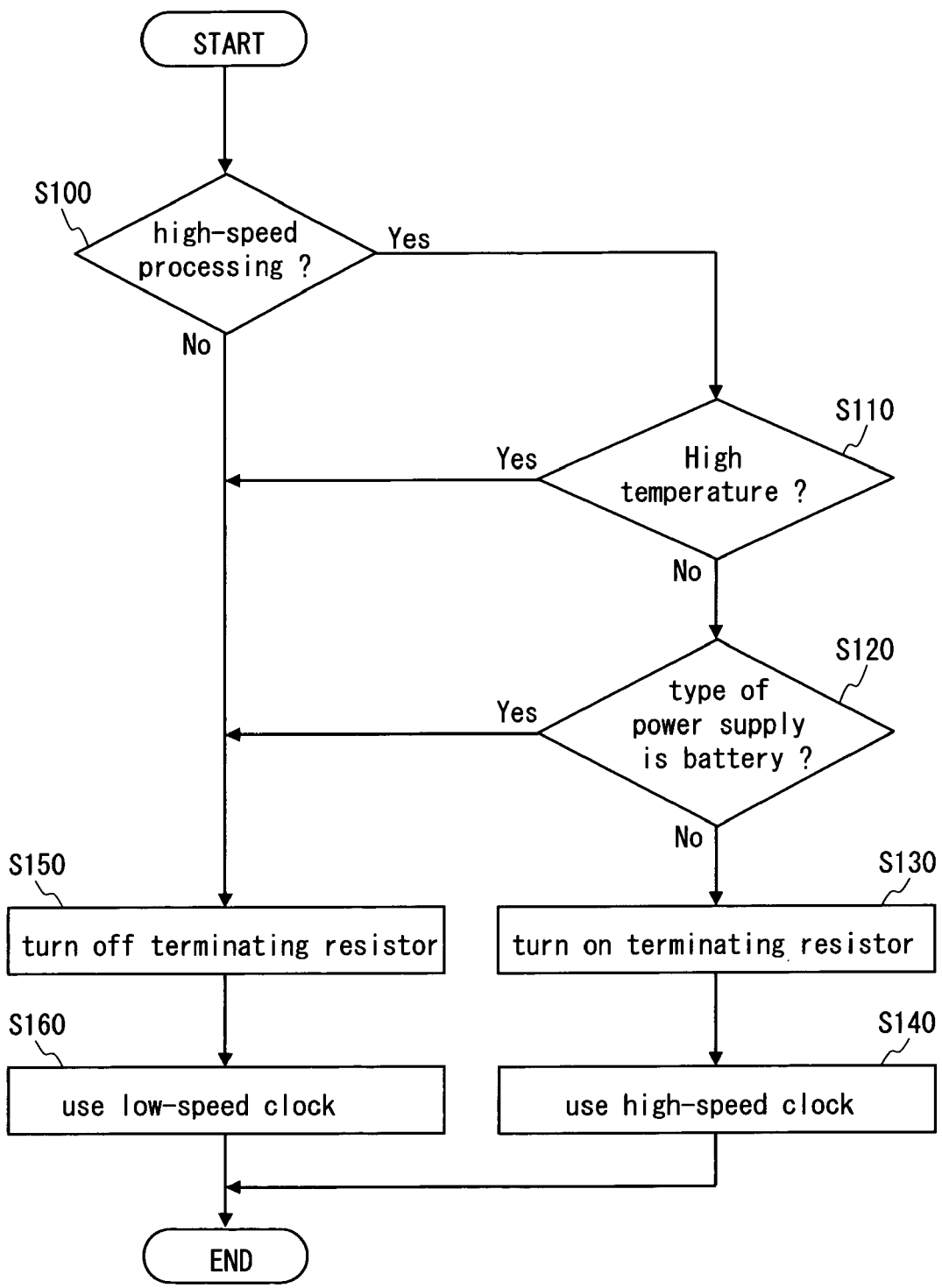
FIG. 2 is a view illustrating an example of operations of the digital camera illustrated in FIG. 1.

FIG. 2 illustrates an example of the operations of the digital camera 10 illustrated in FIG. 1. Note that steps S100 to S160 are performed by the control unit 60 in accordance with, for example, the program stored in the memory 110.

At the step S100, the processing determining unit 61 determines whether or not the high-speed processing requiring the high-speed data transfer is performed. For example, the processing determining unit 61 determines whether or not the high-speed processing is performed based on information for determination to determine whether it is the high-speed processing or not (information and so on representing processing corresponding to the high-speed processing). For example, the information for determination is generated in advance based on a simulation, an experiment, and so on at a design time of the digital camera 10, and included in the program and so on stored at the memory 110. Note that the information for determination may be updated by an update and so on of firmware.

When the high-speed processing is not performed ("No" at the step S100), the control unit 60 (the power control unit 64 in more detail) performs the control for power saving at the steps S150, S160. It is thereby possible in this embodiment to reduce the power consumption of the digital camera 10 when the high-speed processing is not performed. On the other hand, when the high-speed processing is performed ("Yes" at the step S100), the operation of the control unit 60 transfers to the step S110.

At the step S110, the temperature determining unit 62 determines whether or not the temperature detected by the temperature detection unit 90 is higher than the threshold temperature set in advance. When the temperature detected by the temperature detection unit 90 is higher than the threshold temperature ("Yes" at the step S110), the control unit 60 performs the control for power saving at the steps S150, S160. It is thereby possible in this embodiment to prevent that the power consumption increases when the temperature of the device such as the imaging sensor 31 is high. As a result, it is possible in this embodiment to prevent that the device such as the imaging sensor 31 becomes higher than the upper limit temperature, and to prevent the breakage of the device such as the imaging sensor 31. On the other hand, the operation of the control unit 60 transfers to the step S120 when the temperature detected by the temperature detection unit 90 is equal to or less than the threshold temperature ("No" at the step S110).

At the step S120, the power supply determining unit 63 determines whether or not the type of the power supply is the battery. When the type of the power supply is the battery ("Yes" at the step S120), the control unit 60 performs the control for power saving at the steps S150, S160. It is thereby possible in this embodiment to prevent that the power consumption increases and to suppress consumption of the battery when the type of the power supply is the battery. On the other hand, when the type of the power supply is not the battery ("No" at the step S120), the control unit 60 (the power control unit 64 in more detail), performs the control for the high-speed processing at the steps S130, S140. For example, when the type of the power supply is the AC power, the control unit 60 performs the control for the high-speed processing at the steps S130, S140.

At the step S130, the power control unit 64 outputs the resistor control signal RCON to enable the terminating resistor RT to the buffer unit 40, and enables (turns on) the terminating resistor RT. It is thereby possible to reduce the reflection of the signal even when the buffer unit 40 operates in synchronization with the high-speed clock CLK.

At the step S140, the power control unit 64 outputs to the clock generating unit 70 the clock control signal CCON for supplying the high-speed clock CLK to each block, and sets the clock CLK output from the clock generating unit 70 at the high-speed clock CLK. It is thereby possible in this embodiment to operate the digital camera 10 with a relatively high-speed clock CLK (high-speed clock CLK). For example, it is possible in this embodiment to operate the buffer unit 40 with the high-speed clock CLK2 when the high-speed processing is performed. The digital camera 10 is able to perform the high-speed and accurate data transfer (for example, the high-speed transfer of the image data) and perform the high-speed processing appropriately, by the steps S130, S140.

At the step S150, the power control unit 64 outputs the resistor control signal RCON to disable the terminating resistor RT to the buffer unit 40 and disables (turns off) the terminating resistor RT. It is thereby possible to prevent that current flows at the transmission line of the buffer unit 40, the terminating power supply VTT and so on via the terminating resistor RT, and to drastically reduce the power consumption of the buffer unit 40.

At the step S160, the power control unit 64 outputs to the clock generating unit 70 the clock control signal CCON for supplying the low-speed clock CLK to each block, and the clock CLK output from the clock generating unit 70 is set at the low-speed clock CLK. It is thereby possible in this embodiment to operate the digital camera 10 with a relatively low-speed clock CLK (low-speed clock CLK), and to reduce the power consumption. For example, it is possible in this embodiment to operate the buffer unit 40 with the low-speed clock CLK2 when the power consumption is to be reduced.

As stated above, the digital camera 10 performs the high-speed processing by using the high-speed clock CLK when the high-speed processing is performed under a condition in which the temperature of the device is equal to or less than the threshold temperature and the type of the power supply is not the battery in this embodiment. Besides, the digital camera 10 performs the high-speed processing by using the low-speed clock CLK when the high-speed processing is performed under a condition in which the temperature of the device is higher than the threshold temperature in this embodiment. Similarly, the digital camera 10 performs the high-speed processing by using the low-speed clock CLK when the high-speed processing is performed under a condition in which the type of the power supply is the battery. For example, the digital camera 10 makes a photographing interval long compared to a case in which the photographing in continuous shooting mode is performed with the high-speed clock CLK, when the photographing in continuous shooting mode (high-speed processing) is performed with the low-speed clock CLK.

As stated above, the digital camera 10 includes the power control unit 64 disabling the terminating resistor RT and setting the clock CLK generated by the clock generating unit 70 at low speed compared to the case in which the terminating resistor RT is enabled when the high-speed processing is not performed, in this embodiment. Besides, the digital camera 10 enables the terminating resistor RT and sets the operation clock at the high-speed clock CLK and thereby, it is possible to perform the high-speed processing appropriately when the temperature of the device is equal to or less than the threshold temperature and the type of the power supply is the AC power in this embodiment. Accordingly, it is possible in this embodiment to reduce the power consumption in the digital camera 10 supporting the high-speed processing. In particular, the terminating resistor RT is disabled when the digital camera 10 is operated with the low-speed clock CLK in this embodiment, and therefore, the power consumption can be reduced drastically.

Figure 3:
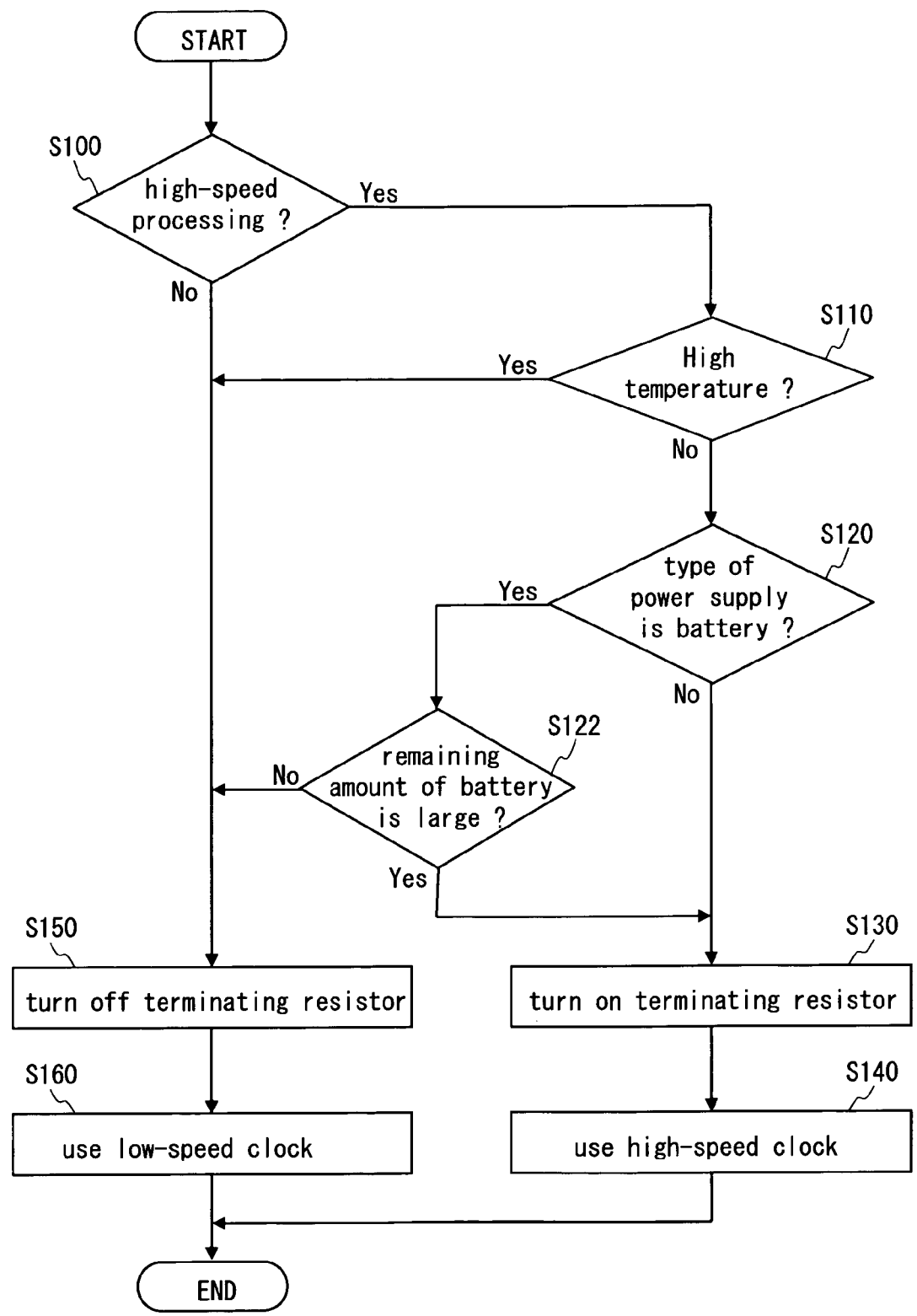
FIG. 3 is a view illustrating an example of operations of a digital camera according to another embodiment.

FIG. 3 illustrates an example of operations of a digital camera 10 in another embodiment. Note that the operations in FIG. 3 are the same as FIG. 2 except a point that step S122 is added to the above-stated operations illustrated in FIG. 2. For example, the power supply determining unit 63 of the digital camera 10 in this embodiment determines whether or not a remaining amount of the battery is more than a reference amount set in advance when the type of the power supply is the battery. The other configuration of the digital camera 10 is the same as the above-stated FIG. 1. The same reference symbols and numerals are used to designate the same and corresponding components as the components described in FIG. 1 to FIG. 2, and the detailed description thereof will not be given. The steps S100 to S160 are performed by the control unit 60 in accordance with, for example, the programs stored in the memory 110.

At the step S120, the operation of the control unit 60 transfers to the step S122 when the type of the power supply is determined to be the battery ("Yes" at the step S120). Note that the control unit 60 (the power control unit 64 in more detail) performs the control for the high-speed processing at the steps S130, S140 when the type of the power supply is not the battery ("No" at the step S120).

At the step S122, the power supply determining unit 63 determines whether or not the remaining amount of the battery is more than the reference amount (for example, a half amount of a capacity of the battery) which is set in advance. The control unit 60 (the power control unit 64 in more detail) performs the control for power saving at the steps S150, S160 when the remaining amount of the power supply is equal to or less than the reference amount ("No" at the step S122). It is thereby possible in this embodiment to prevent that the power consumption increases and to suppress the consumption of the battery when the remaining amount of the power supply is small.

On the other hand, the control unit 60 performs the control for the high-speed processing at the steps S130, S140 when the remaining amount of the battery is more than the reference amount ("Yes" at the step S122). For example, the power control unit 64 enables the terminating resistor RT and sets the clock CLK generated by the clock generating unit 70 at high speed compared to the case in which the terminating resistor RT is disabled when the remaining amount of the power supply is more than the reference amount even in the case in which the high-speed processing is performed under the condition in which the type of the power supply is the battery. It is thereby possible in this embodiment to perform the high-speed processing appropriately when the remaining amount of the battery is large even when the type of the power supply is the battery.

As stated above, it is possible to obtain the similar effect as the above-stated embodiment described in FIG. 1 and FIG. 2 also in this embodiment. Further, the power supply determining unit 63 of this embodiment determines whether or not the remaining amount of the battery is more than the reference amount set in advance when the type of the power supply is the battery. It is thereby possible in this embodiment to perform the high-speed processing appropriately when the remaining amount of the battery is large even when the type of the power supply is the battery.

Note that an example is described in the above-stated embodiments in which the digital camera 10 is made up by including the processing determining unit 61, the temperature determining unit 62 and the power supply determining unit 63. The present invention is not limited to the embodiments. For example, the digital camera 10 may be made up by excluding the temperature determining unit 62, the power supply determining unit 63 and the temperature detection unit 90 from the above-stated configuration illustrated in FIG. 1. In this configuration, the power control unit 64 enables the terminating resistor RT and sets the clock CLK output from the clock generating unit 70 at the high-speed clock CLK regardless of the temperature of the device and the type of the power supply when the high-speed processing is performed. It is possible to obtain the similar effect as the above-stated embodiments also in this case. In particular, the power consumption can be reduced with a simple configuration.

Besides, for example, the digital camera 10 may be made up by excluding the power supply determining unit 63 from the configuration illustrated in FIG. 1. The operations of the digital camera 10 of this configuration are the same as FIG. 2 except the point that the step S120 is excluded from the above-stated operations in FIG. 2. For example, the power control unit 64 enables the terminating resistor RT and sets the clock CLK output from the clock generating unit 70 at high-speed clock CLK regardless of the type of the power supply when the high-speed processing is performed under the condition in which the temperature of the device is equal to or less than the threshold temperature. It is possible to obtain the similar effect as the above-stated embodiments also in this case.

Otherwise, for example, the digital camera 10 may be made up by excluding the temperature determining unit 62 and the temperature detection unit 90 from the configuration illustrated in FIG. 1. The operations of the digital camera 10 of this configuration are the same as FIG. 2 and FIG. 3 except the point in which the step S110 is excluded from the operations of the above-stated FIG. 2 and FIG. 3. For example, the power control unit 64 enables the terminating resistor RT and sets the clock CLK output from the clock generating unit 70 at the high-speed clock CLK regardless of the temperature of the device when the high-speed processing is performed under the condition in which the type of the power supply is not the battery (or in which the remaining amount of the battery is more than the reference amount). It is possible to obtain the similar effect as the above-stated embodiments also in this case.

Further, for example, the digital camera 10 may be made up by excluding the processing determining unit 61 and the power supply determining unit 63 from the configuration illustrated in FIG. 1. In this configuration, the power control unit 64 enables the terminating resistor RT and sets the clock CLK output from the clock generating unit 70 at the high-speed clock CLK regardless of the performance of the high-speed processing and the type of the power supply when the temperature of the device is equal to or less than the threshold temperature. Namely, the terminating resistor RT is disabled and the clock CLK is set at the low-speed clock CLK when the temperature of the device is higher than the threshold temperature. It is possible to obtain the similar effect as the above-stated embodiments also in this case. In particular, the breakage of the device such as the imaging sensor 31 can be prevented with a simple configuration.

Besides, for example, the digital camera 10 may be made up by excluding the processing determining unit 61, the temperature determining unit 62 and the temperature detection unit 90 from the configuration illustrated in FIG. 1. In this configuration, the power control unit 64 enables the terminating resistor RT and sets the clock CLK output from the clock generating unit 70 as the high-speed clock CLK regardless of the performance of the high-speed processing and the temperature of the device when the type of the power supply is not the battery (or when the remaining amount of the battery is more than the reference amount). Namely, the terminating resistor RT is disabled and the clock CLK is set at the low-speed clock CLK when the type of the power supply is the battery (or when the remaining amount of the battery is equal to or less than the reference amount). It is possible to obtain the similar effect as the above-stated embodiments also in this case. In particular, it is possible in this case to suppress the consumption of the battery with a simple configuration.

In the above-stated embodiments, an example is described in which the photographing in continuous shooting mode and the moving image photographing is determined as the high-speed processing. The present invention is not limited to the embodiments. For example, the processing determining unit 61 may determine that the high-speed processing is performed also when a photographing in single-shot mode is performed. Namely, a classification between the high-speed processing or not may be appropriately set in advance in accordance with capacities of hardware and software by, for example, the simulation, the experiment, and so on at the design time of the digital camera 10. It is possible to obtain the similar effect as the above-stated embodiments also in this case.

In the above-stated embodiments, an example is described in which the clock CLK is switched into two stages of the high-speed clock CLK and the low-speed clock CLK. The present invention is not limited to the embodiments. For example, the clock CLK may be switchable into three stages and four stages or more. For example, the clock generating unit 70 is made up to be capable of generating the high-speed clock CLK, the low-speed clock CLK, and an ultra-low-speed clock CLK which is in lower speed than the low-speed clock CLK when the clock CLK is switchable into three stages. In this case, the clock CLK generated by the clock generating unit 70 is set at any of the high-speed clock CLK, the low-speed clock CLK or the ultra-low-speed clock CLK based on the clock control signal CCON. For example, the clock CLK generated by the clock generating unit 70 is set at either the low-speed clock CLK or the ultra-low-speed clock CLK under the condition in which the terminating resistor RT is disabled in the above-stated operations in FIG. 2 and FIG. 3. It is possible to obtain the similar effect as the above-stated embodiments also in this case.

In the above-stated embodiments, an example is described in which the imaging device of the present invention is applied to the digital camera 10. The present invention is not limited to the embodiments. For example, the imaging device of the present invention may be applied to a digital video camera, a cellular phone, a mobile device such as a mobile personal computer and so on. Otherwise, the imaging device of the present invention may be applied to a desk top personal computer and so on. It is possible to obtain the similar effect as the above-stated embodiments also in this case.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging device, comprising:
   an imaging unit having an imaging sensor which converts a subject image into an electrical signal and generating an image data of a photographed image;
   a buffer unit having a terminating resistor and temporarily storing the image data;
   an image processing unit performing image processing on the image data;

a processing determining unit determining whether or not high-speed processing requiring a high-speed data transfer is performed; and a power control unit disabling the terminating resistor and setting a clock supplied to the buffer unit at low speed compared to a case in which the terminating resistor is enabled when the high-speed processing is not performed.

2. The imaging device according to claim 1, further comprising:

a temperature detection unit detecting a temperature at a predetermined position inside the imaging device; and a temperature determining unit determining whether or not the temperature detected by the temperature detection unit is higher than a threshold temperature set in advance, wherein the power control unit disables the terminating resistor and sets the clock at low speed compared to the case in which the terminating resistor is enabled when the temperature detected by the temperature detection unit is higher than the threshold temperature even when the high-speed processing is performed.

3. The imaging device according to claim 1, further comprising a power supply determining unit identifying a type of a power supply, wherein the power control unit disables the terminating resistor and sets the clock at low speed compared to the case in which the terminating resistor is enabled when the type of the power supply is a battery even when the high-speed processing is performed.

4. An imaging device, comprising:

an imaging unit having an imaging sensor which converts a subject image into an electrical signal and generating an image data of a photographed image;

a buffer unit having a terminating resistor and temporarily storing the image data;

an image processing unit performing image processing on the image data;

a temperature detection unit detecting a temperature at a predetermined position inside the imaging device;

a temperature determining unit determining whether or not the temperature detected by the temperature detection unit is higher than a threshold temperature set in advance; and a power control unit disabling the terminating resistor and setting a clock supplied to the buffer unit at low speed compared to a case in which the terminating resistor is enabled when the temperature detected by the temperature detection unit is higher than the threshold temperature.

5. An imaging device, comprising:

an imaging unit having an imaging sensor which converts a subject image into an electrical signal and generating an image data of a photographed image;

a buffer unit having a terminating resistor and temporarily storing the image data;

an image processing unit performing image processing on the image data;

a power supply determining unit identifying a type of a power supply; and a power control unit disabling the terminating resistor and setting a clock supplied to the buffer unit at low speed compared to a case in which the terminating resistor is enabled when the type of the power supply is a battery.

6. The imaging device according to claim 5, wherein the power supply determining unit determines whether or not a remaining amount of the battery is more than a reference amount set in advance when the type of the power supply is the battery, and the power control unit enables the terminating resistor and sets the clock at high speed compared to a case in which the terminating resistor is disabled when the remaining amount of the battery is more than the reference amount even when the type of the power supply is the battery.

* * * * *